(12) United States Patent
Makiyori et al.

(10) Patent No.: US 7,877,743 B2
(45) Date of Patent: Jan. 25, 2011

(54) PROGRAM TRANSLATION METHOD AND NOTIFYING INSTRUCTION INSERTING METHOD

(75) Inventors: Yoko Makiyori, Kyoto (JP); Taketo Heishi, Osaka (JP); Akira Takuma, Osaka (JP)

(73) Assignee: Panasonic Corporation, Osaka (JP)

( * ) Notice: Subject to any disclaimer, the term of this patent is extended or adjusted under 35 U.S.C. 154(b) by 1067 days.

(21) Appl. No.: 11/595,900

(22) Filed: Nov. 13, 2006

(65) Prior Publication Data

US 2007/0113220 A1    May 17, 2007

(30) Foreign Application Priority Data

Nov. 11, 2005    (JP)    .............................. 2005-327028

(51) Int. Cl.
G06F 9/44    (2006.01)
G06F 9/45    (2006.01)
G06F 11/00    (2006.01)
G06F 15/00    (2006.01)

(52) U.S. Cl. .................... 717/158; 712/233; 714/38; 717/107; 717/128; 717/142

(58) Field of Classification Search ................ 717/107, 717/128–130, 137, 141–142, 149, 154, 158–159; 714/35–38; 712/233–240
See application file for complete search history.

(56) References Cited

U.S. PATENT DOCUMENTS

| | | | | |
|---|---|---|---|---|
| 5,359,608 A | * | 10/1994 | Belz et al. ...................... | 714/38 |
| 5,581,696 A | * | 12/1996 | Kolawa et al. ................ | 714/38 |
| 5,586,020 A | * | 12/1996 | Isozaki ....................... | 717/159 |
| 5,594,904 A | * | 1/1997 | Linnermark et al. ........ | 717/124 |

(Continued)

FOREIGN PATENT DOCUMENTS

JP    11-316696 A    11/1999

OTHER PUBLICATIONS

Bottaci, Leonardo; "Instrumenting Programs with Flag Variables for Test Data Search by Genetic Algorithm"; ACM, 2002, 6 pg.*

(Continued)

*Primary Examiner*—Wei Y Zhen
*Assistant Examiner*—Ryan D Coyer
(74) *Attorney, Agent, or Firm*—McDermott Will & Emery LLP

(57) ABSTRACT

The present invention comprises: a converting step for converting a source program into a machine language program; an inserting step for inserting notifying instructions for notifying that the source program has been executed in the machine language program; and a program generating step for generating the executable program from the machine language program in which the notifying instructions are inserted. Further, in the inserting step, the notifying instructions are placed at the entry points of each basic block that constitutes the machine language program and the notifying instructions to which the same conditions as those of the conditional instruction groups are granted are placed at the entry points of conditional instruction groups provided in the machine language program. In the program generating step, identification information for identifying the notifying instructions is granted to each of the notifying instructions. According to this, the present invention enables analysis of the executed range in the program that includes the conditional instructions as well.

5 Claims, 12 Drawing Sheets

U.S. PATENT DOCUMENTS

| | | | |
|---|---|---|---|
| 5,940,622 A * | 8/1999 | Patel | 717/158 |
| 6,106,571 A | 8/2000 | Maxwell | |
| 6,631,363 B1 * | 10/2003 | Brown et al. | 719/318 |
| 7,110,934 B2 * | 9/2006 | Berent et al. | 703/17 |
| 2002/0199177 A1 * | 12/2002 | Ogawa et al. | 717/149 |
| 2003/0033592 A1 * | 2/2003 | Tsubata et al. | 717/128 |
| 2004/0154006 A1 | 8/2004 | Heishi et al. | |
| 2005/0086653 A1 | 4/2005 | Heishi et al. | |

OTHER PUBLICATIONS

Bruschi et al., "A Framework for the Functional Verification of SystemC Models", Springer, 2005, 28 pg.*

Choi et al., Techniques for Debugging Parallel Programs with Flowback Analysis, ACM, 1991, 40 pg.*

Ferguson et al., "Debugging Systems at the Source Langauge Level"; ACM, 1963, 3 pg.*

* cited by examiner

F I G. 1
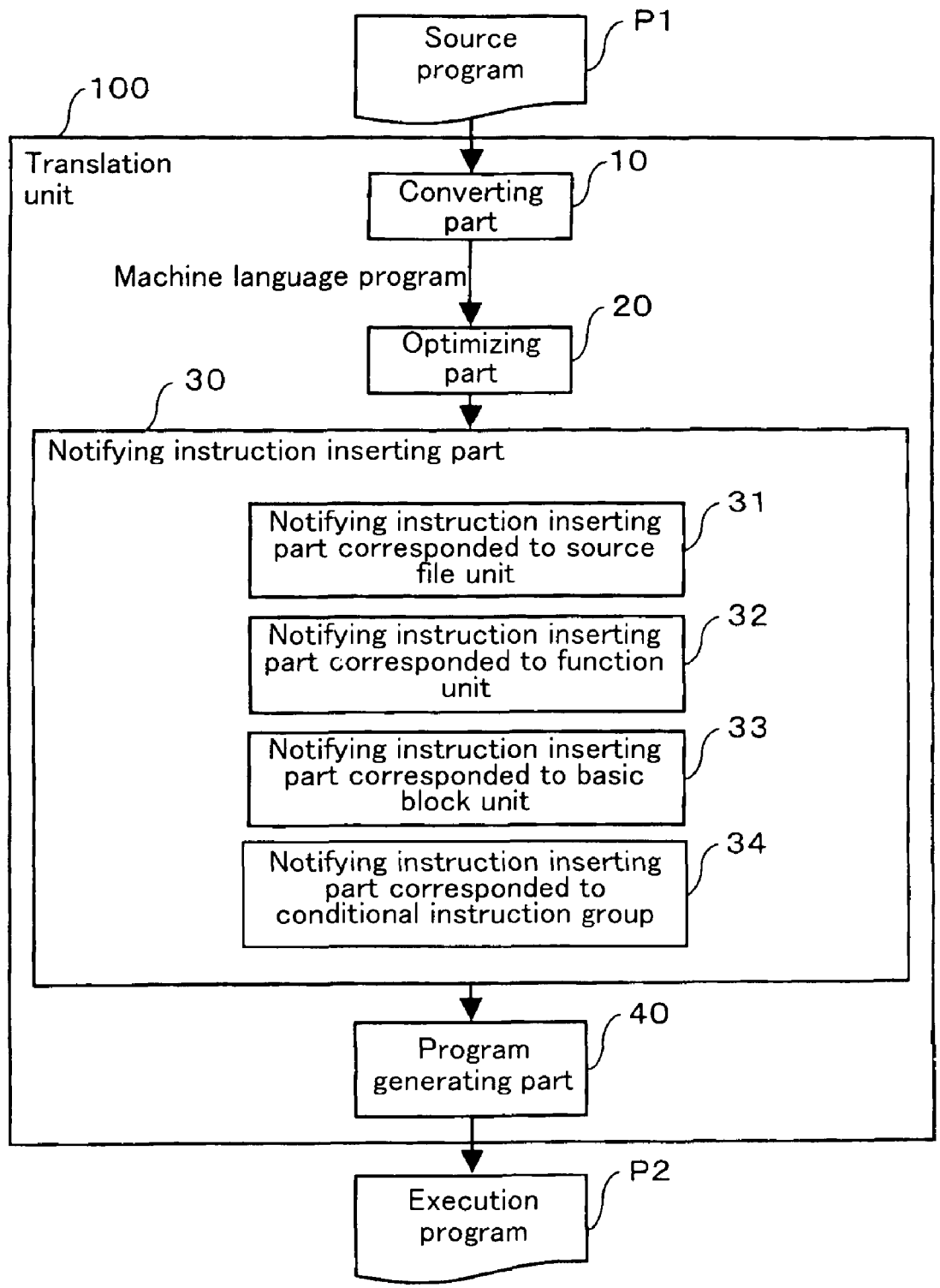

F I G. 9

```
1.        ·
2.  The entry point of external function A (the entry point of basic block A) :
3.              Notifying instruction (1-11)
4.        ·
5.        ·
6.              Conditions a, b specifying instruction ; ;
7.  [Condition a] notifying instruction (3-2)
8.  [Condition a] instruction 1 ; ;
9.  [Condition b] notifying instruction (3-3)
10.             Instruction 2 ; ;
11.             Instruction 3
12.             Instruction 4 ; ;
13. [Condition b] instruction 5
14. [Condition b] instruction 6 ; ;
15.             Notifying instruction (1-12)
16.             Function end instruction ; ;
17.
18. The entry point of basic block B :
19.             Notifying instruction (3-1)
20.        ·
21.        ·
22.             Notifying instruction (1-13)
23.             Function end instruction ; ;
24.
25. The entry point of internal function a (the entry point of basic block C) :
26.             Notifying instruction (2-1)
27.        ·
28.        ·
29.             Notifying instruction (2-2)
30.             Function end instruction ; ;
31.        ·
32.        ·
33. The entry point of external function B (the entry point of basic block D) :
34.             Notifying instruction (1-14)
35.        ·
36.        ·
37.             Specifying instruction ; ;
38. The entry point of basic block E :
39.             Notifying instruction (3-1)
40.             Instruction 1 ; ;
41.    [Condition c] notifying instruction (3-3)
42.    [Condition c] instruction 2 ; ;
43.        ·
44.             Specifying instruction ; ;
45.             Instruction 3
46. The entry point of basic block F :
47.             Notifying instruction (3-2)
48.        ·
49.        ·
50.             Notifying instruction (1-15)
51.             Function end instruction ; ;
52.
53. The entry point of internal function b (the entry point of basic block G) :
54.             Notifying instruction (2-1)
55.        ·
56.             Notifying instruction (2-2)
57.             Function end instruction ; ;
58.        ·
```

```
1.      .
2.      .
3.    1 — 1 1      ···The entry point of external function A
4.    3 — 2
5.    2 — 1        ······The entry point of internal function a
6.    1 — 1 4     ··········The entry point of external function B
7.    3 — 2
8.    1 — 1 5     ··········The exit point of external function B
9.    2 — 2        ······The exit point of internal function aA
10.   3 — 1
11.   1 — 1 3     ···The exit point of external function A
12.     .
13.     .
```

FIG. 13
PRIOR ART

```
1.              ·
2.   The entry point of basic block
3.                Notifying instruction i1
4.                Instruction 1
5.              ·
6.              ·
7.   The entry point of basic block B :
8.                Notifying instruction i2
9.                Instruction 2
10.               Specifying instruction
11.     [Condition a] instruction 3
12.             ·
13.             ·
14.  The entry point of basic block C :
15.               Notifying instruction i3
16.               Instruction 4
17.             ·
18.             ·
19.             ·
```

FIG. 14
PRIOR ART

```
1.              ·
2.   The entry point of basic block A
3.                Notifying instruction i1
4.                Instruction 1
5.              ·
6.              ·
7.                Specifying instruction
8.     [Condition a] Notifying instruction i2
9.   The entry point of basic block B
10.               Instruction 2
11.               Specifying instruction
12.    [Condition a] instruction 3
13.             ·
14.             ·
15.  The entry point of basic block C
16.               Notifying instruction i3
17.               Instruction 4
18.             ·
19.             ·
```

PROGRAM TRANSLATION METHOD AND NOTIFYING INSTRUCTION INSERTING METHOD

BACKGROUND OF THE INVENTION

Field of the Invention

The present invention relates to a program translation method and a method of inserting an notifying instruction, that are suitable for coverage measurement performed by inserting notifying instructions.

As a conventional coverage measurement method, a method has been used that notifying instructions are inserted in a program in advance, and the executed range is analyzed from the information that is notified at execution of the program. There are two types in the conventional notifying instruction inserting method. One is a method that inserts an notifying instruction for each basic block in a machine language program that is converted from a source program, and the other is a method that inserts an notifying instruction for each branch point in the source program. Each notifying instruction is provided in advance with an ID number (capable of discriminating from each other) that is unique in the entire program.

Regarding a method of inserting the conventional notifying instruction, FIG. 11 shows the structure for the case where the notifying instruction is inserted for each basic block in the machine language program, while FIG. 12 shows the structure for the case where the notifying instruction is inserted for each branch point in the source program.

In FIG. 11, a translation unit 200 comprises: a converting part 10 for converting a source program P1 to a machine language program; an optimizing part 20 for eliminating the redundancy of the machine language program; an inserting part for an notifying instruction 30 for each basic block; and an executable program generating part 40 for generating an executable program P2. The notifying instruction inserting part 30 for each basic block searches the basic blocks in the machine language program, and inserts the notifying instructions given the ID numbers in the searched basic blocks.

In FIG. 12, a translation unit 300 comprises: an notifying instruction inserting part 5 for inserting the notifying instruction to each branch point of the source program P1; a converting part for converting the source program with the inserted notifying instructions into a machine language program; an optimizing part 20 for eliminating the redundancy of the machine language program; and an executable program generating part 40 for generating an executable program P2. The notifying instruction inserting part 5 searches the branch points in the machine language program, and inserts the notifying instructions given the ID numbers in the searched branch points.

Japanese Published Patent Literature (Japanese Unexamined Patent Publication 11-316696) discloses a method that inserts the notifying instructions given ID numbers, that are unique within the entire program, in the branch points in the source program, and analyzes the executed range from the information notified at the time of executing the program.

However, in the conventional method that inserts the notifying instruction in each basic block in the machine language program, it is not possible to generate the notifying instruction that corresponds to a conditional instruction, when the conditional instruction is included in the program as a target of measurement.

The aforementioned issue can be solved with the conventional method that inserts the notifying instructions in the source program before being converted to the machine language program, but not with the conventional method that inserts the notifying instructions in the machine language program. This is due to a reason because the notifying instruction inserted in the source program is automatically translated into an executable program including the conditional instruction at the time of translating the program.

However, when the optimization of the machine language program is performed in the conventional measuring method that inserts the notifying instructions in the source program before being converted to the machine language program, there is possibility that the inserted notifying instructions are moved to unintended places. As a result, it causes such an issue that the executed range cannot be analyzed accurately.

Specific examples of the conventional measurement method will be described referring to FIG. 13 and FIG. 14. FIG. 13 is a diagram showing the case where the notifying instructions are inserted in each basic block in the machine language program according to the structure shown in FIG. 11.

In the case of the machine language program shown in FIG. 13, the program is constituted with basic blocks A, B, and C. Notifying instructions i1, i2, and i3 that correspond to each of the basic blocks are inserted in the machine language program, and the executed range is analyzed from the information that those notifying instructions notifies at the time of executing the program. For example, regarding the instruction 1 on the fourth line, it can be judged that the instruction 1 on the fourth line is executed if the notifying instruction i1 on the third line within the same basic block is executed.

However, the execution state of the conditional instruction on the eleventh line changes depending on a Boolean value of condition A that is granted to the instruction. Thus, even if the notifying instruction on the eighth line within the same basic block is executed, it is not possible to judge whether or not the conditional instruction on the eleventh line is executed as well.

FIG. 14 is a diagram showing the case where the notifying instructions are inserted in each branch point of the source program, which is then converted to the machine language program and optimized by the structure shown in FIG. 12.

The example of the machine language program shown in FIG. 14 is constituted with basic blocks A, B, and C. It is assumed that the entry points of the basic blocks A, B, and C correspond to branch points a, b, and c, respectively, in the source program before being converted to the machine language program. In the machine language program, the notifying instructions i1, i2, and i3 that correspond to the branch points a, b, and c of the source program are inserted, and the executed range is analyzed from the information that those notifying instructions notify at the time of executing the program.

However, in the machine language program, the notifying instruction corresponding to the branch point b in the source program is moved to the eighth line that is before the entry point of the basic block B, as a result of the optimization. Thus, it is not possible to judge whether or not the instruction within the basic block b is executed.

Because of those reasons, when the machine language program including a conditional instruction is optimized, it is not possible to analyze the executed range accurately in the conventional measuring method.

SUMMARY OF THE INVENTION

The main object of the present invention therefore is to provide a translation method and a method of inserting an notifying instruction, which are capable of analyzing the executed range accurately and efficiently even when a conditional instruction is included in a program that is a target of measurement.

Furthermore, it is expected that the number of the notifying instructions to be inserted into the program will increase by executing the present invention. Therefore, it is also an object of the present invention to overcome this additional issue by reducing the amount of information that is notified by each notifying instruction, through using the notifying instructions hierarchically.

In order to overcome the aforementioned issues, the program translation method according to the present invention is a method for translating a source program into an executable program, which comprises the steps of:

- a converting step for converting the source program into a machine language program;
- an inserting step for inserting notifying instructions for notifying that the source program has been executed in the machine language program; and
- a program generating step for generating the executable program from the machine language program in which the notifying instructions are inserted, wherein
- in the inserting step, the notifying instructions are placed at entry points of each basic block that constitutes the machine language program and, the notifying instructions to which the same conditions as those of the conditional instruction groups are granted are placed at entry points of conditional instruction groups provided in the machine language program, and
- in the program generating step, identification information for identifying the notifying instructions are granted to each of the notifying instructions.

According to this structure, the notifying instructions that correspond to each basic block and the notifying instructions that correspond to each conditional instruction group are inserted. Thus, it becomes possible to analyze the executed range even if the conditional instructions are included in the program that is a target of measurement.

There is also such an embodiment that the inserting step further comprises the steps of:

- a first searching sub-step for searching the entry points of the each basic block that constitutes the machine language program;
- a first instruction arranging sub-step for arranging the notifying instructions at the entry points of the basic blocks searched in the first searching sub-step;
- a second searching sub-step for searching the entry points of the conditional instruction groups provided in the machine language program; and
- a second instruction arranging sub-step for arranging the notifying instructions, to which same conditions as those of the conditional instruction groups are granted, at the entry points of the conditional instruction groups searched in the second searching sub-step.

There is also such an embodiment that the program generating step further comprises the steps of:

- an identification information generating sub-step for generating the identification information that identifies the notifying instructions for each of the notifying instructions; and
- an identification information granting sub-step for granting the identification information generated in the identification information generating sub-step to each of the notifying instructions.

There is also such an embodiment that the second instruction arranging sub-step further comprises the steps of:

- a third searching sub-step for searching a specifying instruction, in which an authenticity value of a condition that is granted to the conditional instruction group is set, from the entry point of the conditional instruction group towards the entry point of the basic block that includes the conditional instruction group;
- a fourth searching sub-step which searches a vacant place in the instructions executed in parallel between the specifying instruction and the entry point of the conditional executing instruction group when the specifying instruction is present as a result of the third searching sub-step; and
- a first moving sub-step for rearranging the notifying instruction to a vacant place, when the vacant place is present in the instructions executed in parallel as a result of the fourth searching sub-step.

In this case, it is preferable for the second instruction arranging sub-step to further comprise the steps of:

- a fifth searching sub-step which searches a vacant place in the instructions executed in parallel between the entry point of the basic block and the entry point of the conditional executing instruction group when no specifying instruction is present as a result of the third searching sub-step; and
- a second moving sub-step for rearranging the notifying instruction to the vacant place, when the vacant place is present in the instruction executed in parallel as a result of the fifth searching sub-step.

According to this structure, it is possible to prevent deterioration in the execution speed of the program caused by inserting the instructions, through improving grade of the parallel execution in the notifying instructions.

Further, the notifying instruction inserting method according to the present invention is an notifying instruction inserting method for an unconverted source program or a converted machine language program, which comprises the steps of:

- a unit group determining step for determining a plurality of unit groups which are constituted with units that divide the inserting-target program and are in an inclusive relation with each other;
- a first unit selecting step for selecting a first unit as one of the units for dividing the inserting-target program, from the group of units;
- a program dividing step for dividing the inserting-target program by the first unit;
- a entry point/exit point searching step for searching the entry points and exit points of every divided regions in the inserting-target program that is divided in the program dividing step;
- an instruction arranging step for arranging the notifying instructions at each of the starting points and exit points that are searched in the entry point/exit point searching step;
- a first identification information generating step for generating first identification information that corresponds to the notifying instructions placed at each of the entry points and the exit points;
- a first identification information granting step for granting the first identification information to each of the notifying instructions;
- a second unit selecting step for selecting a second unit that is included in the first unit from the group of units;
- a second identification information generating step for generating second identification information that specifies each of the notifying instructions at positions where the divided region is divided by the second unit; and
- a second identification information granting step for granting the second identification information for specifying the notifying instruction to each of the notifying instructions present at the positions where the divided region is divided by the second unit.

In this case, it is preferable to execute the first unit selecting step, the program dividing step, the entry point/exit point searching step, the instruction arranging step, the first identification information generating step, the first identification information granting step, the second unit selecting step, the second identification information generating step, and the second identification information granting step with respect to all of the program units.

According to this structure, it is possible to reduce the size of the identification information by using the notifying instructions hierarchically so as to prevent shortage of the ID numbers granted to the increasing number of notifying instructions.

There is also such an embodiment that the notifying instruction inserting method further comprises a correspondence judging step for judging whether or not the entry points and the exit points in all of the divided regions correspond one-on-one, wherein when judged as a result of the correspondence judging step that the entry points and the exit points in all of the divided regions correspond one-on-one, an operation for searching the exit points in the entry point/exit point searching step, an operation for arranging the notifying instructions at the exit points in the instruction arranging step, operations for generating the first and second identification information at the exit points in the first and second identification information generating steps, and operations for granting the first and second identification information to the exit points in the first and second identification information granting steps are omitted. "The entry points and the exit points in all of the divided regions correspond one-on-one" means that there are only a single entry point and a single exit point in a given divided region.

According to this structure, it is possible to dimidiate the notifying instructions corresponded to the units through omitting the inserting of the notifying instructions into the exit points. Thus, it becomes possible to prevent the increase in the size of the program and deterioration in the execution speed thereof.

Furthermore, there is also such an embodiment that the notifying instruction inserting method further comprises an overlap judging step for judging whether or not the entry points in the divided regions are same as the entry points of another divided regions that are divided by the another first unit including the first unit that is a dividing unit of the divided region, wherein when judged as a result of the overlap judging step that the entry points of the divided regions are the same as the entry points of the another divided regions, an operation for searching the entry points in the entry point/exit point searching step, an operation for arranging the notifying instructions in the entry points in the instruction arranging step, operations for generating the first and second identification information at the entry points in the first and second identification information generating steps, and operations for granting the first and second identification information to the entry points in the first and second identification information granting steps for the divided regions are omitted.

Alternatively, there is also such an embodiment that the notifying instruction inserting method further comprises an overlap judging step for judging whether or not the exit points in the divided regions are the same as the exit points of another divided regions that are divided by the another first unit including the first unit that is a dividing unit of the divided region, wherein when judged as a result of the overlap judging step that the exit points of the divided regions are same as the exit points of the another divided regions, an operation for searching the exit points in the entry point/exit point searching step, an operation for arranging the notifying instructions at the exit points in the instruction arranging step, operations for generating the first and second identification information at the exit points in the first and second identification information generating steps, and operations for granting the first and second identification information to the exit points in the first and second identification information granting steps are omitted.

According to this structure, it is possible to prevent the increase in the size of the program and deterioration in the execution speed thereof through omitting the inserting of the overlapping notifying instructions.

There is also such an embodiment that in generating object files that correspond to the respective inserting-target programs constituted with a plurality of source files in the notifying instruction inserting method described above, a plurality of the object files are generated without performing the first, second identification information generating steps and the first, second identification information granting steps in the divided regions where the first and second identification information depend on each other between the source files; and the first, second identification information generating steps and the first, second identification information granting steps are performed subsequently in linking the object files.

According to the present constitution, when the program that is constituted with a plurality of source files is retranslated, it becomes possible to omit the step for regenerating the object files at the time of retranslation with respect to a source file whose contents are not changed from the previous translation.

In the present invention, the notifying instructions that correspond to each basic block and the notifying instructions that correspond to each conditional instruction group are inserted. Thus, it becomes possible to analyze the executed range even if the conditional instructions are included in the program that is a target of measurement.

Further, although the number of the notifying instructions to be inserted in the program is expected to increase by executing the present invention, it becomes possible to prevent a shortage of the ID numbers granted to the notifying instructions by using the notifying instructions hierarchically.

The technique of the present invention is effective as a coverage measuring method and the like that is capable of analyzing the executed range of the program that includes the conditional instructions.

BRIEF DESCRIPTION OF THE DRAWINGS

Other objects of the present invention will become clear from the following description of the preferred embodiments and the appended claims. Those skilled in the art will appreciate that there are many other advantages of the present invention by embodying the present invention.

FIG. 1 is a block diagram for describing the structure of an notifying instruction inserting method according to an embodiment of the present invention;

FIG. 9 is a diagram showing an example of an executable program that is generated from the machine language program according to the embodiment of the present invention;

FIG. 13 is a diagram showing an example of the related art where the notifying instructions are inserted in each of the basic blocks in a machine language program; and FIG. 14 is a diagram showing an example of the related art where the notifying instructions are inserted in each of the branch points in a source-program, which is then converted to a machine language program and optimized.

DETAILED DESCRIPTION OF THE INVENTION

Figure 2:
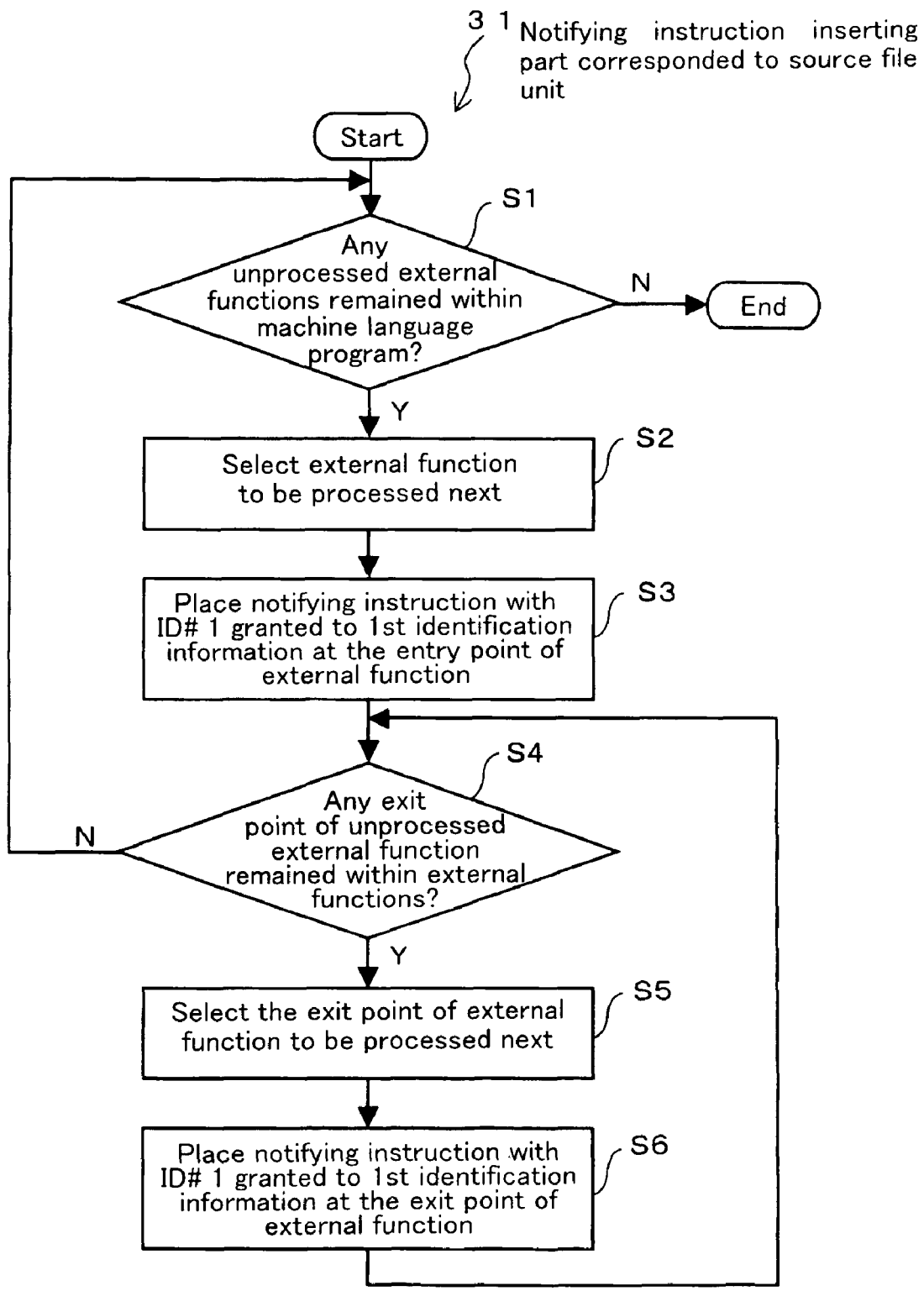
FIG. 2 is a diagram showing the procedure for inserting the notifying instructions in accordance with a source file unit in the embodiment of the present invention.

Hereinafter, a translation method and an notifying instruction inserting method according to the present invention will be described in detail referring to the accompanying drawings. FIG. 1 is a block diagram for describing the structure of the notifying instruction inserting method according to the present invention.

In FIG. 1, the program translation method according to an embodiment of the present invention is achieved by a program that is executed on a computer such as a personal computer, so as to translate a source program P1 into an executable program by a translation unit 100.

The translation unit 100 comprises a converting part 10 for converting the source program P1 into a machine language program, an optimizing part 20 for eliminating the redundancy of the converted machine language program, an notifying instruction inserting part 30 for inserting the notifying instructions in the machine language program, and an executable program generating part 40 for generating the executable program P2.

The notifying instruction inserting part 30 comprises an notifying instruction inserting part 31 that corresponds to a source file unit within the machine language program, an notifying instruction inserting part 32 that corresponds to a function unit within the machine language program, an notifying instruction inserting part 33 that corresponds to a basic block unit within the machine language program, and an notifying instruction inserting part 34 that corresponds to a group of the conditional instructions within the machine language program.

The procedure of inserting the notifying instructions according to the present invention will be described hereinafter. The embodiment of the present invention uses three types of units, i.e. the source file unit, function unit, basic block unit, as a plurality of units for dividing the machine language program. Further, as the first identification information, ID number 1, ID number 2, ID number 3 are granted in advance respectively to the notifying instructions that are inserted by corresponding to the source file unit, the function unit, and the basic block unit.

First, the procedure of the processing performed by the notifying instruction inserting part 31 that corresponds to the source file unit will be described referring to FIG. 2. In step S1, it is judged whether or not there is any entry point of unprocessed source file, i.e. an external function, in the machine language program. When there is no unprocessed external function, the processing is ended. When there is, it is shifted to step S2 where the external function to be processed next is selected.

In step S3, an notifying instruction to which the ID number 1 is granted as the first identification information is placed at the entry point of the external function. In step S4, it is judged whether or not there is any exit point of the unprocessed external function within the external functions. When judged here that there is no exit point of the unprocessed external function, it is returned to the step S1 to start the next processing. When judged that there is, it is shifted to step S5 where the exit point of the external function to be processed next is selected. In step S6, the notifying instruction to which the ID number 1 is granted as the first identification information is placed at the exit point. Then, it is returned to the step S4.

Next, the procedure of the processing performed by the notifying instruction inserting part 32 that corresponds to the function unit will be described referring to FIG. 3. In step S11, it is judged whether or not there is any unprocessed internal function in the machine language program. When judged that there is no unprocessed internal function, the processing is ended. When judged that there is, it is shifted to step S12 where the internal function to be processed next is selected. In step S13, an notifying instruction to which the ID number 2 is granted as the first identification information is placed at the entry point of the function. In step S14, an ID number that is unique in the source file is granted to the notifying instruction as the second identification information. Instep S15, it is judged whether or not there is any exit point of the unprocessed internal function within the internal functions. When judged here that there is no exit point of the unprocessed external function, it is returned to the step S11 to start the next processing. When judged that there is, it is shifted to step S16 where the exit point of the internal function to be processed next is selected. In step S17, the notifying instruction to which the ID number 2 is granted as the first identification information is placed at the exit point. In step S18, the ID number that is unique in the source file is granted to the notifying instruction as the second identification information. Then, it is returned to the step S15.

The entry points and exit points of the external functions among the regions divided by the function unit overlap with the entry points and exit points of the regions divided by the source file unit that is a unit containing the function unit. Thus, it can be considered that the inserting of the notifying instructions for the entry points and exit points of the external functions can be omitted. Therefore, in inserting the notifying instructions corresponding to the function unit, the processing is performed only to those other than the external functions, i.e. performed only to the internal functions.

Next, the procedure of the processing performed by the notifying instruction inserting part 33 that corresponds to the basic block unit will be described referring to FIG. 4. In step S21, it is judged whether or not there is any unprocessed basic block in the machine language program. When judged that there is no unprocessed basic block, the processing is ended. When judged that there is, it is shifted to step S22 where the basic block to be processed next is selected. In step S23, it is judged whether or not the entry point of the basic block is the same as the entry point of the function. When judged that the entry point of the basic block is the same as the entry point of the function, it is returned to the step S21 to start the next processing. When judged that they are not the same, it is shifted to step S24 where an notifying instruction to which the ID number 3 is granted as the first identification information is placed at the entry point of the basic block. In step S25, an ID number that is unique in the function is granted to the notifying instruction as the second identification information. Then, it is returned to the step S21.

The entry points and exit points of the regions divided by the basic block unit correspond one-on-one in all the divided regions. Thus, it can be considered that the inserting of the notifying instructions to the exit points of the basic blocks can be omitted. Therefore, in inserting the notifying instructions according to the basic block unit, the processing is performed only on the entry points of the basic blocks.

Next, the procedure of the processing performed by the notifying instruction inserting part 34 that corresponds to the conditional instructions will be described referring to FIG. 4. In step S31, it is judged whether or not there is any unprocessed conditional instruction group in the machine language program. When judged that there is no unprocessed conditional instruction group, the processing is ended. When judged that there is, it is shifted to step S32 where the conditional instruction group to be processed next is selected. In step S33, an notifying instruction to which the ID number 3 is granted as the first identification information is placed at the entry point of the conditional instruction group. In step S34, the same execution condition as that of the conditional instruction is granted to the notifying instruction. In step S35, it is judged whether or not there is a specifying instruction for setting the authenticity value of the condition that is granted to the conditional instruction group between the entry point of the conditional instruction and the entry point of the preceding basic block. When judged that there is no specifying instruction, it is shifted to step S36 to start the next processing. When judged that there is, it is shifted to step S37 to start the next processing. In the step S36, it is judged whether or not there exists a vacant place in the instruction executed in parallel between the entry point of the conditional instruction group and the entry point of the basic block that includes the conditional instruction group. The vacant place in the instruction executed in parallel means that a number of the instructions executed in parallel do not reach to the maximum number. When judged that there is no vacant place, it is shifted to step S39 to perform the next processing. When judged that there is, it is shifted to step S38 to perform the next processing. In the step S38, the notifying instruction is replaced at the vacant place in the instruction executed in parallel. In the step S39, an ID number that is unique in the function is granted to the notifying instruction as the second identification information. Then, it is returned to the step S31.

Next, the procedure for generating the second identification information and the procedure for granting the generated second identification information to the notifying instructions that correspond to the source file unit will be described referring to FIG. 6.

The second identification information is generated and granted to the notifying instructions that correspond to the source file unit, in linking to an object file that is generated from the machine language program. In step S41, it is judged whether or not there is any unprocessed notifying instruction in the machine language program. When judged that there is no unprocessed notifying instruction, the processing is ended. When judged that there is, it is shifted to step S42 where the notifying instruction to be processed next is selected. In step S43, it is judged whether or not the first ID number 1 is granted to the first identification information of the notifying instruction. When judged that the ID number 1 is not granted, it is returned to the step S42 to perform the next processing. When judged that the ID number 1 is granted, it is shifted to step S44 where an ID number that is unique in the entire program is granted to the notifying instruction as the second identification information. Then, it is returned to the step S41.

Through the above-described procedures shown in FIG. 2-FIG. 6, the notifying instructions corresponded to each basic block and the notifying instructions corresponded to each conditional instruction group can be inserted. Thus, it is possible to analyze the executed range even if the conditional instruction is included in the program that is a target of measurement.

Figure 5:
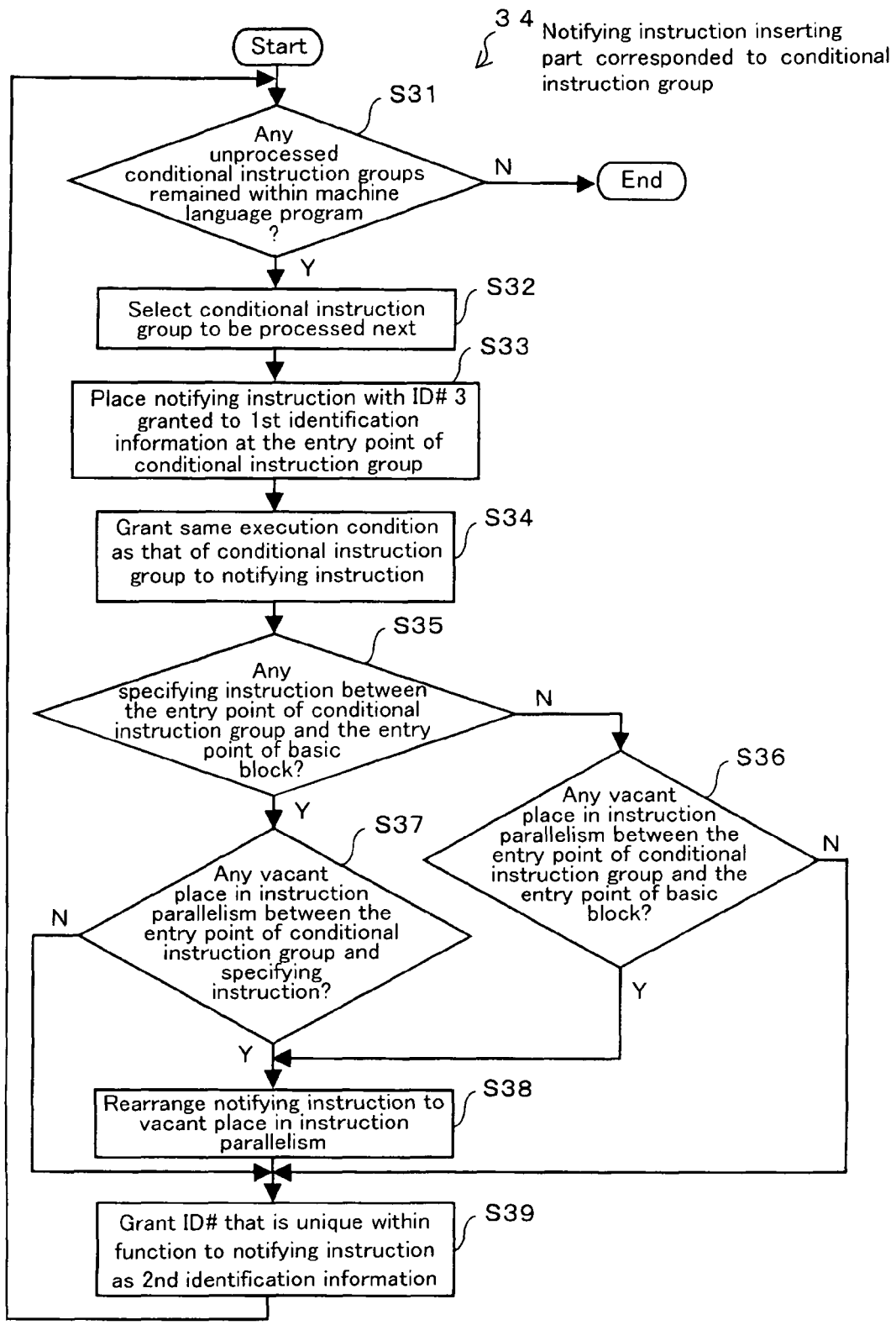
FIG. 5 is a diagram showing the procedure for inserting the notifying instructions in accordance with a conditional instruction unit in the embodiment of the present invention.

In the embodiment of the present invention, the steps S35-S38 shown in FIG. 5 are executed to improve the grade of parallel execution of the notifying instruction. This makes it possible to prevent the deterioration in the execution speed of the program caused by inserting the instructions.

In the embodiment of the present invention, three types of units are used, i.e. the source file unit, function unit and basic block unit, as a plurality of units for dividing the machine language program. Further, through applying the processing flows shown in FIG. 2, FIG. 3 and FIG. 4 to the machine language program, the first identification information and the second identification information is granted to the notifying instructions and the notifying instructions is used hierarchically by each unit. By doing so, the size of the identification information is reduced so as to thereby prevent a shortage of the ID numbers to be granted to the notifying instructions.

Figure 4:
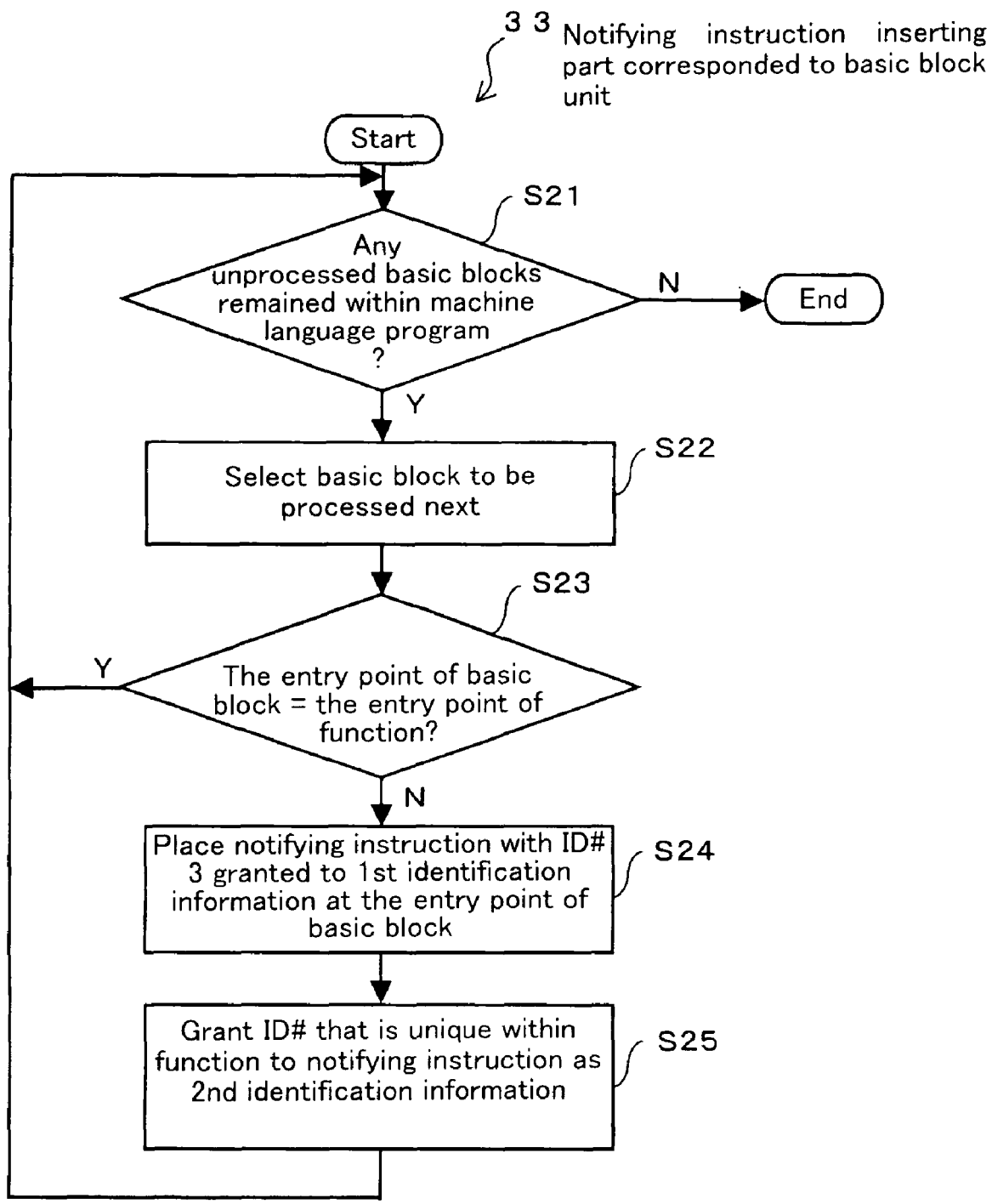
FIG. 4 is a diagram showing the procedure for inserting the notifying instructions in accordance with a basic block unit in the embodiment of the present invention.

As has been described referring to FIG. 4, the entry points and the exit points are corresponded one-on-one in all the divided regions that are divided by the basic block unit. Therefore, inserting of the notifying instructions to the exit points of the basic blocks is omitted. To correspond one-on-one herein means that there are only a single entry point and a single exit point in a given divided region. By omitting the unnecessary inserting of the notifying instructions as described herein, it is possible to prevent an increase in the size of the program and deterioration in the execution speed.

Figure 3:
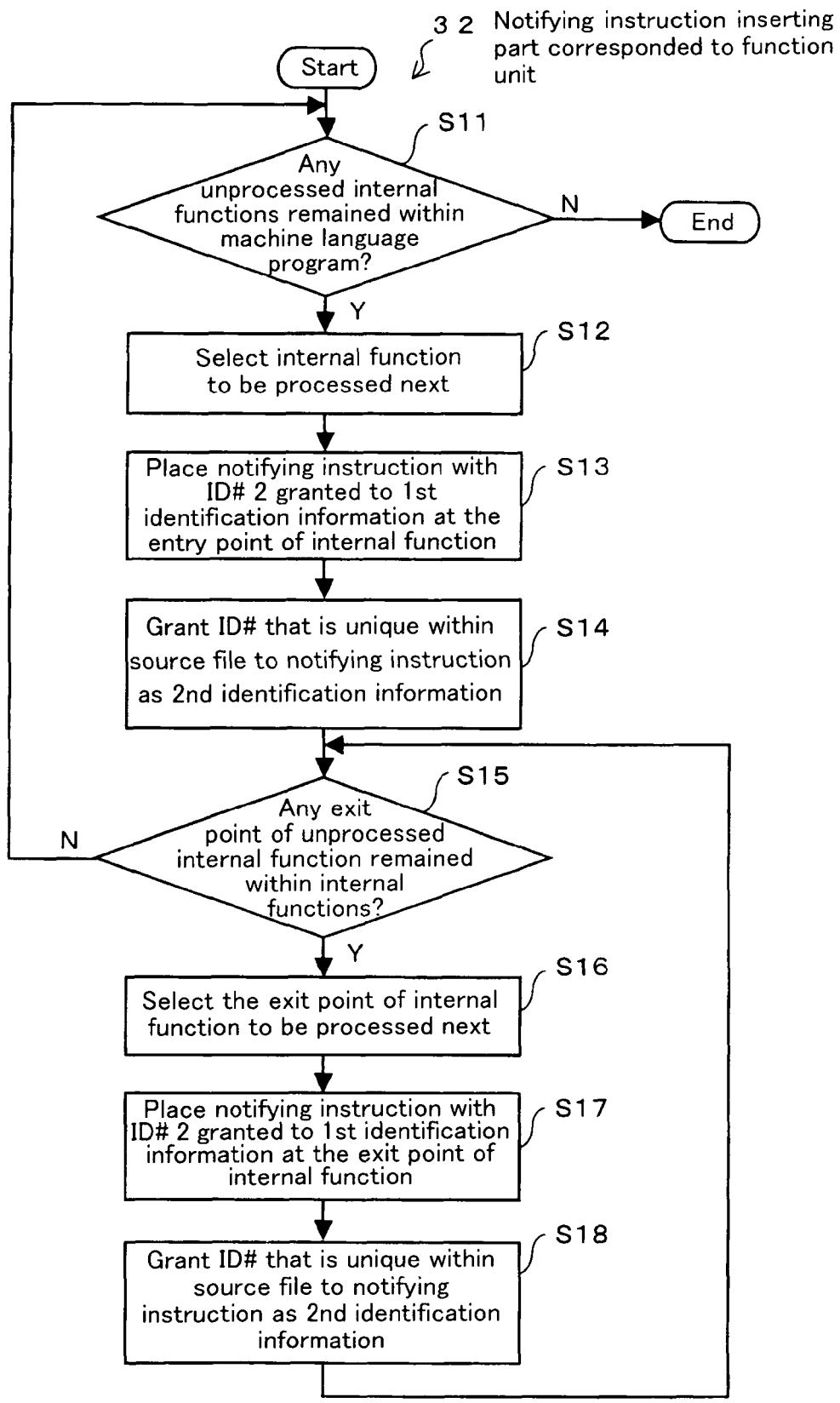
FIG. 3 is a diagram showing the procedure for inserting the notifying instructions in accordance with a function unit in the embodiment of the present invention.

As has been described referring to FIG. 3, the entry points and the exit points in the regions divided by the function unit overlap with the entry points and the exit points of the regions divided by the source file unit that is a unit containing the function unit. Thus, inserting of the notifying instructions is omitted. Further, when the entry point of the basic block overlaps with the entry point of the function during the selection in the step S24 of FIG. 4, inserting of the notifying instruction is omitted. By omitting the inserting of the overlapped notifying instructions, it is possible to prevent an increase in the size of the program and deterioration in the execution speed.

Figure 6:
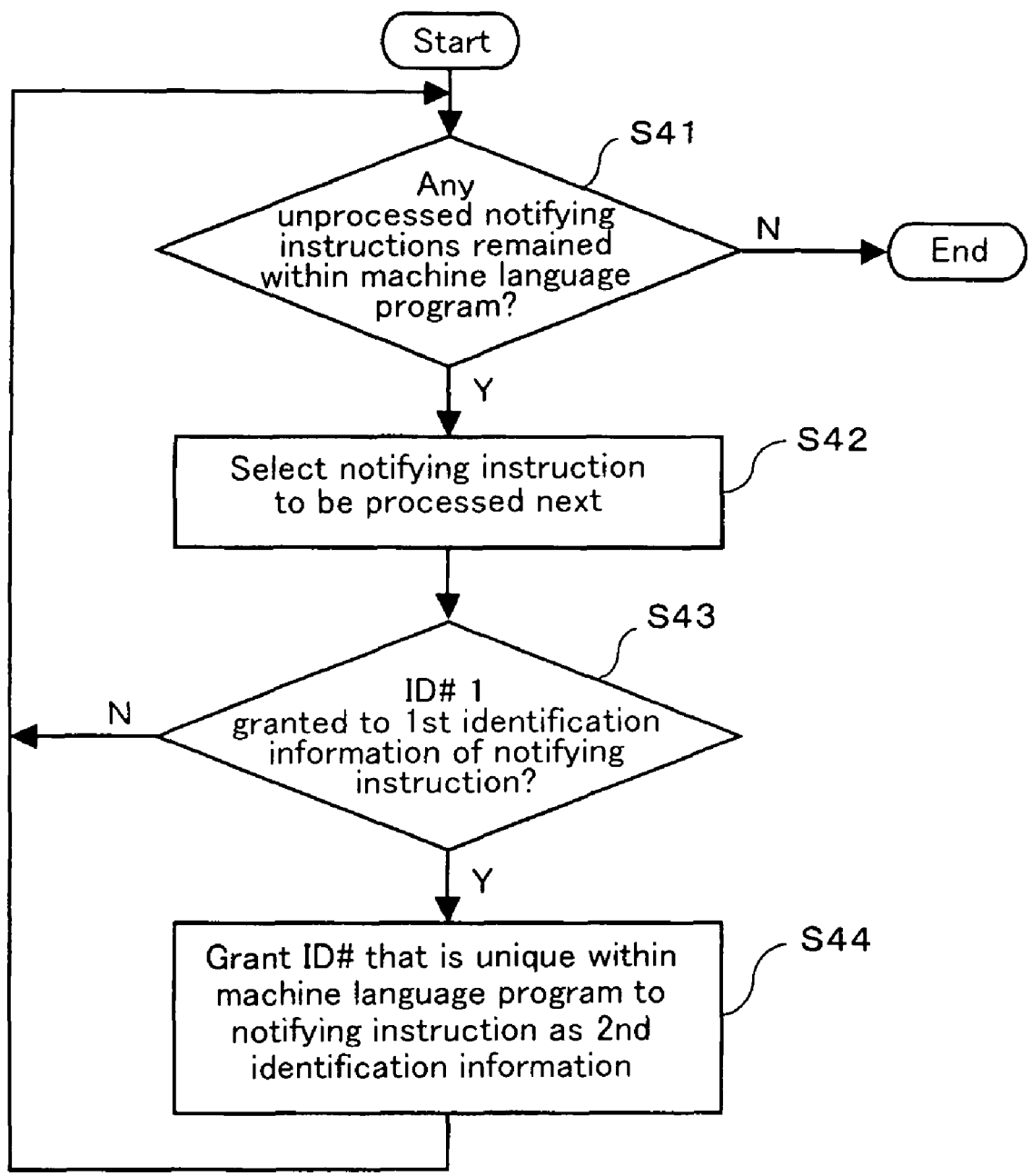
FIG. 6 is a diagram showing the procedure for generating and adding the second identification information for the notifying instructions that correspond to the source file unit in the embodiment of the present invention.

As has been described in FIG. 6, through executing the steps S41-S44 of FIG. 6 in linking to the object file that is generated from the machine language program, it becomes possible to omit the step of regenerating the object file from the source file whose contents have not been changed from the previous translation, in case of retranslating the program that is constituted with a plurality of source files.

Now, a correspondent relationship between the fundamental structure of the invention and the structure of the embodiment will be described. The inserting step comprises:

a first searching sub-step (corresponds to the steps S21, S22 of FIG. 4) for searching the entry points of each basic block that constitutes the machine language program;

a first instruction arranging sub-step (corresponds to the step S24 of FIG. 4) for arranging the notifying instructions at the entry points of the basic blocks searched in the first searching sub-step;

a second searching sub-step (corresponds to the steps S31, S32 of FIG. 5) for searching the entry points of each conditional instruction group in the machine language program; and a second instruction arranging sub-step (corresponds to the steps S33, S34 of FIG. 5) for arranging the notifying instructions, to which the same conditions as those of the conditional instruction groups are granted, at the entry points of the conditional instruction groups searched in the second searching sub-step.

The program generating step comprises:

an identification information generating sub-step for generating the identification information that identifies the notifying instruction for each of the notifying instructions; and an identification information adding sub-step (corresponds to the steps S41-S44 of FIG. 6) for granting the identification information generated in the identification information generating sub-step to each of the notifying instructions.

The second instruction arranging sub-step comprises:

a third searching sub-step (corresponds to the step S35 of FIG. 5) for searching, from the entry point of the conditional instruction group towards the entry point of the basic block that includes the conditional instruction group, the specifying instruction in which the authenticity value of the condition granted to the conditional instruction group is set;

a fourth searching sub-step (corresponds to the step S37 of FIG. 5) which searches a vacant place in the instruction executed in parallel between the specifying instruction and the entry point of the conditional executing instruction group when the specifying instruction is present as a result of the third searching sub-step;

a first moving sub-step (corresponds to the step S38 of FIG. 5) for rearranging the notifying instruction to the vacant place, when there is the vacant place in the instruction executed in parallel as a result of the fourth searching sub-step;

a fifth searching sub-step (corresponds to the step S36 of FIG. 5) which searches a vacant place in the instruction executed in parallel between the entry point of the basic block and the entry point of the conditional executing instruction group when there is no specifying instruction as a result of the third searching sub-step; and a second moving sub-step (corresponds to the step S38 of FIG. 5) for rearranging the notifying instruction to the vacant place, when there is the vacant place in the instruction executed in parallel as a result of the fifth searching sub-step.

Furthermore, it comprises:

a unit group determining step for determining a group of plurality of units which are constituted with the units that divide the inserting-target program and are in an inclusive relation with each other;

a first unit selecting step for selecting a first unit as one of the units for dividing the inserting-target program from the unit group;

a program dividing step for dividing the inserting-target program by the first unit;

a entry point/exit point searching step (corresponds to the steps S11, S12, S15, S16 of FIG. 3) for searching the entry points and exit points of every divided regions of the inserting-target program that is divided in the program dividing step;

an instruction arranging step (corresponds to the steps S13 and S17 of FIG. 3) for arranging the notifying instructions at each of the starting points and exit points that are searched in the entry point/exit point searching step;

a first identification information generating step (corresponds to the step S18 of FIG. 3) for generating the first identification information that corresponds to the notifying instructions placed at each of the entry points and the exit points;

a first identification information adding step (corresponds to the step S18 of FIG. 3) for granting the first identification information to each of the notifying instructions;

a second unit selecting step (corresponds to the steps S21 and S22 of FIG. 4) for selecting the second unit that is included in the first unit;

a second identification information generating step (corresponds to the step S25 of FIG. 4) for generating the second identification information that specifies each of the notifying instructions at the positions where the above-described divided region is divided by the second unit; and a second identification information granting step (corresponds to the step S25 of FIG. 4) for granting the second identification information for specifying the notifying instruction to each of the notifying instructions located at the positions where the above-described divided region is divided by the second unit.

Moreover, the following steps correspond to the step S23 of FIG. 4. The steps are:

a correspondence judging step for judging whether or not the entry points and the exit points in the entire divided regions correspond one-on-one;

an overlap judging step for judging whether or not the entry points in the divided regions are the same as the entry points of the another divided regions that are divided by the another first unit that includes the first unit as the dividing unit of the relevant divided region; and an overlap judging step for judging whether or not the exit points in the divided regions are the same as the exit points of the another divided regions that are divided by the another first unit that includes the first unit as the dividing unit of the relevant divided region.

Next, a specific example of the notifying instruction inserting method according to the embodiment of the present invention will be described referring to FIG. 7-FIG. 10. It is assumed here that the executable program P2 generated by the present invention is executed on a processor that is capable of performing parallel execution of up to two instructions. Furthermore, presume that the processor comprises the notifying instructions for notifying two kinds of identification information supplied in advance, when the processor itself is operated.

The first identification information and the second identification information granted to each of the notifying instructions is written at the end of the notifying instruction in a form of "(the first identification information—second identification information)".

Figure 7:
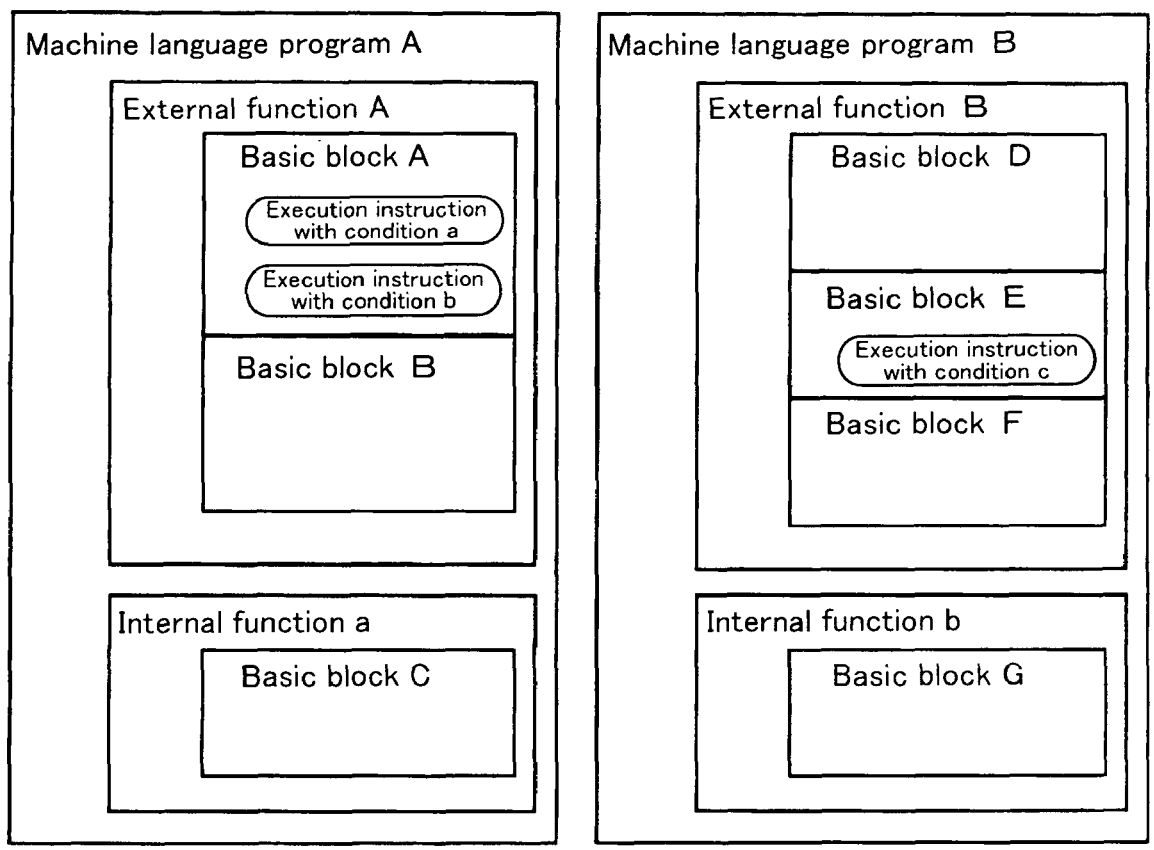
FIG. 7 is a schematic diagram of a machine language program according to the embodiment of the present invention.
Figure 8:
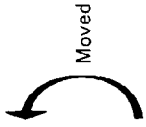
FIG. 8 is a diagram showing an example where notifying instructions are inserted in the machine language program according to the embodiment of the present invention.

In FIG. 7 and FIG. 8, it is assumed that the machine language programs A and B are obtained by converting and optimizing the source files a and b respectively. FIG. 8 does not illustrate the state of a certain point, but illustrates the chronologically changing state in an overlapping manner. In the machine language program A, it is necessary to pay attention in particular to the point that the notifying instruction (3-3) is shifted from the thirteenth line to the ninth line.

As shown in FIG. 7, the machine language program A includes the external function A and the internal function a. The external function A includes the basic blocks A, B, and two conditional instruction groups corresponding to the conditions a, b are present within the basic block A. The function ending instruction of the external function A is present at two points of the basic blocks A and B. The internal function "a" includes the basic block C, and the basic block C includes the function ending instruction.

Further, the machine language program B includes the external function B and the internal function b. The external function B includes the basic blocks D, E and F. The basic block D includes the setting instruction of the condition c. The basic block E includes the conditional instruction group that corresponds to the condition c. The basic block F includes the function end instruction. The internal function b includes the basic block G. The basic block G includes the function end instruction.

First, the inserting processing of the notifying instructions is described focusing attention on the case of the machine language program A. At first, the notifying instructions corresponded to the source file unit is processed. According to the procedure shown in FIG. 2, the entry point of the unprocessed source file, i.e. the external function, is searched in step S1. In accordance with the search result, the external function A is selected in step S2. In step S3, the notifying instruction, to which the ID number 1 is granted as the first identification information, is arranged in the third line that is the entry point of the external function A. The unprocessed exit point is searched in step S4. In accordance with the search result, the exit point in the sixteenth line is selected in step S5. In step S6, the notifying instruction to which the ID number 1 is granted as the first identification information is arranged in the sixteenth line. Then, it is returned to the step S4 to search the unprocessed exit point. In accordance with the search result, the exit point in the twenty-third line is selected in the step S5. In the step S6, the notifying instruction to which the ID number 1 is granted as the first identification information is arranged in the twenty-third line. Then, it is returned to the step S4 to search the unprocessed exit point. When there is no unprocessed exit point found therein as a result of the search, it is returned to the step S1 where the unprocessed external function is searched. Upon obtaining the search result that no unprocessed external function is present therein, the processing is ended.

Next, inserting processing of the notifying instructions corresponded to the function unit will be described. According to the procedure shown in FIG. 3, the unprocessed internal function is searched in step S11. In accordance with the search result, the internal function "a" is selected in step S12. In step S13, the notifying instruction, to which the ID number 2 is granted as the first identification information, is arranged in the twenty-seventh line that is the entry point of the internal function "a". In step S14, the ID number "1" that is the unique number within the source file is granted to the notifying instruction as the second identification information. That is, the notifying instruction (2-1) is inserted in the twenty-seventh line. In step S15, the unprocessed exit point is searched. In accordance with the search result, the exit point in the thirtieth line is selected in step S16. In step S17, the notifying instruction to which the ID number 2 is granted as the first identification information is arranged in the thirtieth line. In step S18, the ID number "2" that is the unique number within the source file is granted to the notifying instruction as the second identification information. That is, the notifying instruction (2-2) is inserted in the thirtieth line. Then, it is returned to the step S15 to search the unprocessed exit point. When no unprocessed exit point is present therein as a result of the search, it is returned to the step S11 where the unprocessed internal function is searched. Upon obtaining the search result that no unprocessed internal function is present therein, the processing is ended.

Next, inserting processing of the notifying instructions corresponded to the basic block unit will be described. According to the procedure shown in FIG. 4, the unprocessed basic blocks are searched in step S21. In accordance with the search result, the basic block A is selected in step S22. In step S23, it is judged whether or not the entry point of the basic block overlaps with the entry point of the function. When it is judged here that the entry point of the basic block overlaps with the entry point of the function, it is returned to the step S21 to search the unprocessed basic blocks. In accordance with the search result, the basic block B is selected in step S22. In step S23, it is judged whether or not the entry point of the basic block overlaps with the entry point of the function. When it is judged here that the entry point of the basic block does not overlap with the entry point of the function, it is shifted to step S24. In the step S24, the notifying instruction, to which the ID number 3 is granted as the first identification information, is arranged in the twentieth line that is the entry point of the basic block B. In step S25, the ID number "1" that is the unique number within the function is granted to the notifying instruction as the second identification information. That is, the notifying instruction (3-1) is inserted in the twentieth line. Then, it is returned to the step S21 to search the unprocessed basic blocks. In accordance with the search result, the basic block C is selected in the step S22. In the step S23, it is judged whether or not the entry point of the basic block overlaps with the entry point of the function. When it is judged here that the entry point of the basic block overlaps with the entry point of the function, it is returned to the step S21 to search the unprocessed basic blocks. In accordance with a result of the search that no unprocessed basic block is present therein, the processing is ended.

Next, the notifying instruction corresponded to the conditional instruction group will be described. According to the procedure shown in FIG. 5, the unprocessed conditional instruction groups are searched in step S31. In accordance with the search result, the conditional instruction group corresponding to the condition "a" is selected in step S32. In step S33, the notifying instruction, to which the ID number 3 is granted as the first identification information, is arranged in the seventh line that is the head of the conditional instruction group. In step S34, "a" that is the same executing condition as that of the conditional instruction is granted to the notifying instruction. In step S35, it is judged whether or not there is any specifying instruction between the entry point of the conditional instruction group and the entry point of the basic block. Based on a result of the judgment that the specifying instruction is present therein, it is shifted to step S37. In the step S37, it is judged whether or not there is any vacant place in the instruction executed in parallel between the entry point of the conditional notifying instruction and the specifying instruction. When judged that there is no vacant place therein, it is shifted to step S39. In the step S39, the ID number "2" that is the unique number within the function is granted to the notifying instruction as the second identification information. That is, the notifying instruction (3-2) is inserted in the seventh line. Then, it is returned to the step S31 where the unprocessed conditional instruction groups are searched. In accordance with the search result, the conditional instruction group that corresponds to the condition is selected from the unprocessed conditional instruction groups in the step S32. In the step S33, the notifying instruction, to which the ID number 3 is granted as the first identification information, is arranged in the thirteenth line that is the head of the conditional instruction group. In the step S34, "b" that is the same executing condition as that of the conditional instruction is granted to the notifying instruction. In the step S35, it is judged whether or not there is any specifying instruction between the entry point of the conditional instruction group and the entry point of the basic block. In accordance with a result of the judgment that there is the specifying instruction therein, it is shifted to the step S37. In the step S37, it is judged whether or not there is any vacant place in the instruction executed in parallel between the entry point of the conditional notifying instruction and the specifying instruction. In accordance with the judgment result that there are two instructions in the instruction set in the eleventh and twelfth lines and there is no vacant place therein, and that there is only one instruction in the instruction set in the tenth line and there is a vacant place, it is shifted to step S38. In the step S38, the notifying instruction is rearranged in the ninth line where there is a vacant place in the instructions executed in parallel. In the step S39, the ID number "3" that is the unique number within the function is granted to the notifying instruction as the second identification information. That is, the notifying instruction (3-3) is inserted in the ninth line. Then, it is returned to the step S31 where the unprocessed conditional instruction groups are searched. According to a result of the search that there is no unprocessed conditional instruction group therein, the processing is ended.

Next, the inserting processing of the notifying instructions is described focusing attention on the machine language program B. The notifying instructions corresponded to the source file unit, the function unit, and the basic block unit can be processed through the same procedures as those for the machine language program A. Thus, the descriptions thereof will be omitted, and only the processing of the notifying instructions corresponded to the conditional instruction group will be described.

According to the procedure shown in FIG. 5, the unprocessed conditional instruction groups are searched in step S31. In accordance with the search result, the conditional instruction group corresponding to the condition "c" is selected in step S32. In the step S33, the notifying instruction, to which the ID number "3" is granted as the first identification information, is arranged in the tenth line that is the head of the conditional instruction group. In the step S34, "c" that is the same executing condition as that of the conditional instruction is granted to the notifying instruction. In the step S35, it is judged whether or not there is any specifying instruction between the entry point of the conditional instruction group and the entry point of the basic block. According to a result of the judgment that there is no specifying instruction therein, it is shifted to step S36. In the step S36, it is judged whether or not there is any vacant place in the instruction executed in parallel between the entry point of the conditional notifying instruction and the entry point of the basic block. When there is no vacant place found therein as a result of the judgment, it is shifted to the step S39. In the step S39, the ID number "3" that is the unique number within the function is granted to the notifying instruction as the second identification information. That is, the notifying instruction (3-3) is inserted in the tenth line. Then, it is returned to the step S31 where the unprocessed conditional instruction groups are searched. Based on a result of the search that there is no unprocessed conditional instruction group therein, the processing is ended.

The respective object files are generated from the machine language programs A and B in which the notifying instructions are inserted through the procedures described above. A description will be given to the procedure for granting, as the second identification information, the ID number that is unique within the executable program to the notifying instructions having the ID number 1 added as the first identification information (i.e. the notifying instructions placed at a unit of the source file), when the object files are linked to generate the executable program.

FIG. 9 shows an example of the executable program that is generated by linking the object files generated from the machine language programs A and B shown in FIG. 8. According to the procedure shown in FIG. 6, the unprocessed notifying instructions are searched in step S41. In accordance with the search result, the notifying instruction in the third line is selected in step S42. In step S43, it is judged whether or not the ID number 1 is granted to the first identification information. When judged that the ID number 1 is granted, it is shifted to step S44. In the step S44, the ID number "11" that is the unique number within the entire program is granted to the notifying instruction as the second identification information. Then, it is returned to the step S41 where the unprocessed notifying instructions are searched. In accordance with the search result, the notifying instruction in the seventh line is selected in the step S42. In step S43, it is judged whether or not the ID number 1 is granted to the first identification information. When judged that the ID number 1 is not granted thereto, it is returned to the step S41.

The same processing is performed to the notifying instruction in the ninth, fifteenth, nineteenth, twenty-second, twenty-sixth, twenty-ninth, thirty-fourth, thirty-ninth, forty-first, forty-seventh, fiftieth, fifty-fourth, and fifty-sixth lines. As a result, as the second identification information, the ID numbers "12", "13", "14", and "15", which are unique within the entire program, are granted respectively to the notifying instructions on the fifteenth, twenty-second, thirty-fourth, and fiftieth lines. Through the processing described above, the notifying instructions corresponded to each basic block and the notifying instructions corresponded to each conditional instruction group are inserted.

Figures 10, 11:
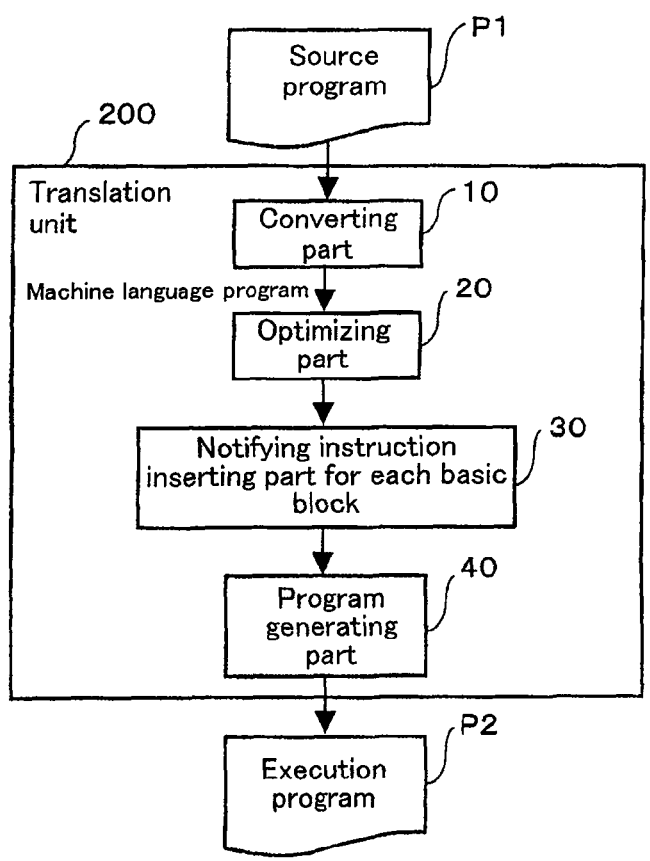
FIG. 10 is a diagram showing an example of identification information that is notified at the time of executing the program according to the embodiment of the present invention.
FIG. 11 is a block diagram (1) for describing the structure of a conventional notifying instruction inserting method.
Figure 12:
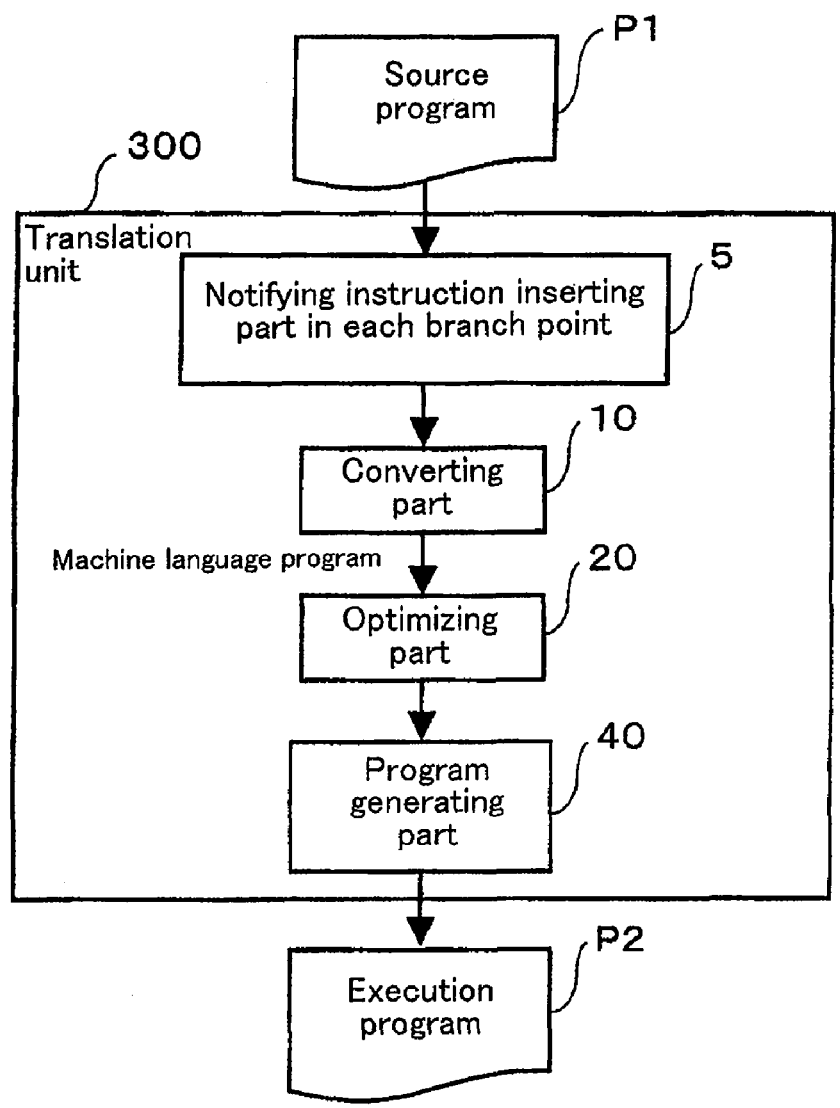
FIG. 12 is a block diagram (2) for describing the structure of a conventional notifying instruction inserting method.

Next, a specific example of the coverage measuring method according to the embodiment of the present invention will be described referring to FIG. 10. FIG. 10 is a diagram showing the contents of the identification information notified when the executable program of FIG. 9 is executed and the order of the notifications. First, the place of the executed notifying instruction is specified from the identification information notified at the time of executing the program and the order of the notification. In the present invention, as the notifying instructions are used hierarchically, the identification information notified at the time of executing the program has a nest structure. Thus, it is possible to judge that the notifying instructions at the same depth are the notifying instructions present within the source file through analyzing the nest by a combination of the identification information of the notifying instructions inserted at the entry point and the exit point of the source file. Similarly, it is possible to judge that the notifying instructions at the same depth are the notifying instructions present within the function through analyzing the nest by a combination of the identification information of the notifying instructions inserted at the entry point and the exit point of the function.

For example, the identification information (3-2), (2-1), (2-2), and (3-1) in the fourth, fifth, ninth, and tenth lines in FIG. 10 is at the same depth as that of a combination of the identification information (1-11) and (1-13) inserted at the entry point and exit point of the external function A. Based on this, the identification information (3-2), (2-1), (2-2), and (3-1) can be judged all as the notifying instructions included in the machine language program A. Similarly, the identification information (3-2) in the seventh line is at the same depth as that of a combination of the identification information (1-14) and (1-15) inserted at the entry point and exit point of the external function B. Based on this, the identification information (3-2) can be judged as the notifying instruction included in the machine language program B. From this, by specifying the place of the notifying instruction that has been executed, the instruction that is executed under the same condition as that of the notifying instruction can be also judged as being executed as well.

For example, if the notifying instruction (1-11) in the third line of FIG. 9 can be judged to be executed, the instruction is the instruction within the same basic block as that of the notifying instruction and the instructions in the sixth, tenth, eleventh, twelfth lines that are not the conditional instructions, can be judged to be executed as well.

Similarly, when the notifying instruction (3-2) in the seventh line of FIG. 9 can be judged to be executed, the conditional instruction in the eighth line, that is the conditional instruction group to which the same condition as that of the notifying instruction is granted, can be judged to be executed as well.

Inversely, when the notifying instruction (3-3) in the ninth line of FIG. 9 can be judged to not be executed, the conditional instructions in the thirteenth and fourteenth lines, that are the conditional instruction group to which the same condition as that of the notifying instruction is granted, can also be judged to not be executed as well.

The embodiment has been described with the examples where the three types of units, i.e. the source file, function, and basic block, are used as a plurality of units for dividing the machine language program. However, the units are not limited to those three types, and the number of the units is not limited to be three, either. Further, although the embodiment has been described with the examples of the processor that is capable of performing the parallel execution of up to two instructions, the instruction executed in parallel is not limited to two instructions. Furthermore, although the embodiment has been described with the examples of using two kinds of identification information, the kinds of the identification information are not limited to two kinds. Moreover, the embodiment has been described with the examples where the inserting processing of the notifying instructions is carried out in order of: granting the first identification information; arranging the instructions into the machine language program; and granting the second identification information. However, the procedure of the inserting processing is not limited to this order.

The present invention has been described in detail referring to the most preferred embodiments. However, various combinations and modifications of the components are possible without departing from the spirit and the broad scope of the appended claims.

What is claimed is:

1. A program translation method for translating a source program into an executable program that performs actions specified by said source program, said method comprising steps of:
    a converting step for converting said source program into a machine language program;
    an inserting step for inserting notifying instructions for notifying that said notifying instructions have been executed in said machine language program, wherein the inserting step occurs subsequent to the converting step; and
    a program generating step for generating said executable program from said machine language program in which said notifying instructions are inserted, wherein
    in said inserting step, said notifying instructions are placed at entry points of each basic block that constitutes said machine language program, and conditional notifying instructions are placed at the entry points of each conditional instruction group and are granted the same condition as each said conditional instruction group, and
    in said program generating step, identification information for identifying said notifying instructions is granted to each of said notifying instructions.

2. The program translation method according to claim 1, wherein said inserting step further comprises steps of:
    a first searching sub-step for searching said entry points of each said basic block that constitutes said machine language program;
    a first instruction placing sub-step for placing said notifying instructions at said entry points of said basic blocks searched in said first searching sub-step;
    a second searching sub-step for searching said entry points of said conditional instruction groups that constitutes said machine language program; and
    a second instruction placing sub-step for placing said notifying instructions, at said entry points of each said conditional instruction group searched in said second searching sub-step and granting said notifying instructions to the same condition as each said conditional instruction group.

3. The program translation method according to claim 2, wherein said program generating step further comprises steps of:
    an identification information generating sub-step for generating said identification information that identifies said notifying instructions by each of said notifying instructions; and
    an identification information granting sub-step for granting said identification information generated in said identification information generating sub-step to each of said notifying instructions.

4. The program translation method according to claim 3, wherein said second instruction placing sub-step further comprises:
    a third searching sub-step for searching a specifying instruction that specifies the condition to said conditional instruction group from said entry point of said conditional instruction group to the entry point of said basic block that includes said conditional instruction group;
    a fourth searching sub-step for searching a vacant place in parallel instruction groups between said specifying instruction and said entry point of said conditional instruction group when said specifying instruction is found as a result of said third searching sub-step; and a first moving sub-step for moving said notifying instruction to said vacant space when said vacant space is found as a result of said fourth searching sub-step.

5. The program translation method according to claim 4, wherein said second instruction arranging sub-step further comprises steps of:

a fifth searching sub-step which searches a vacant place in said instructions executed in parallel between said entry point of said basic block and said entry point of said conditional executing instruction group when no specifying instruction is present as a result of said third searching sub-step; and a second moving sub-step for rearranging said notifying instruction to said vacant place, when said vacant place is present in said instructions executed in parallel as a result of said fifth searching sub-step.

* * * * *